March 31, 1925.
H. G. IRWIN
HEADING MACHINE
Filed Feb. 24, 1921
1,531,293
7 Sheets-Sheet 2
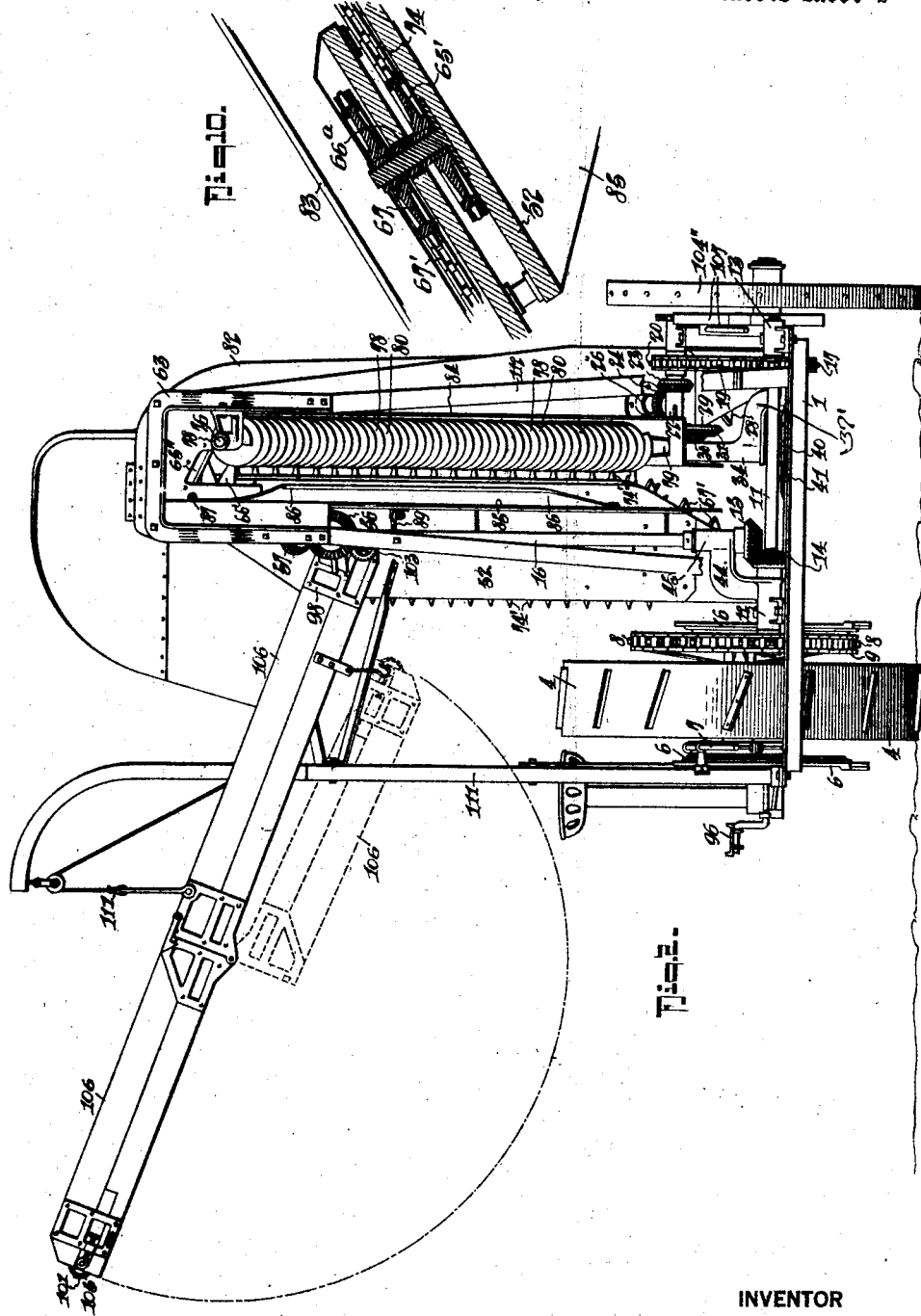
INVENTOR
Herbert G. Irwin.
BY
ATTORNEYS March 31, 1925.
H. G. IRWIN
HEADING MACHINE
Filed Feb. 24, 1921
1,531,293
7 Sheets-Sheet 3
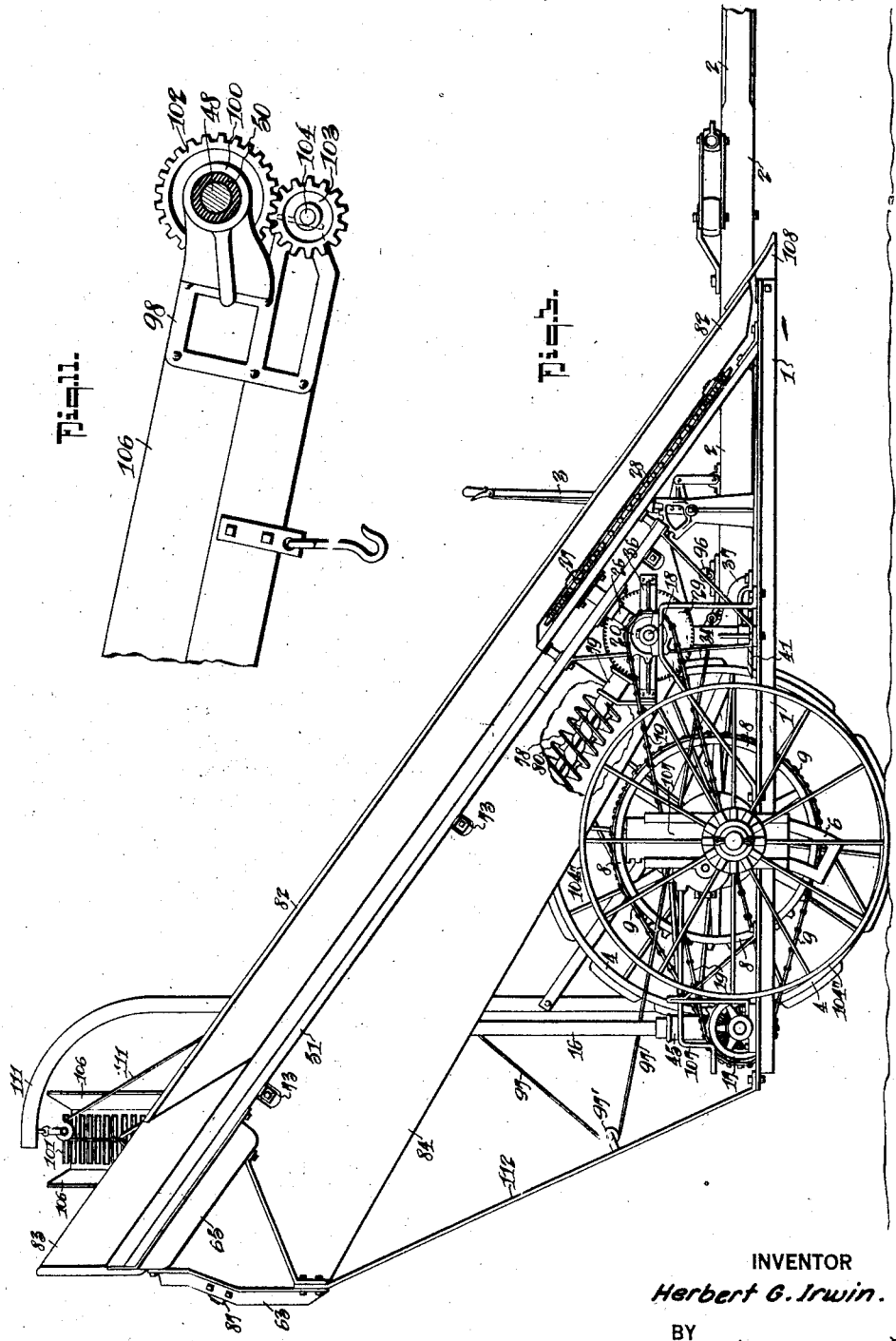
INVENTOR
Herbert G. Irwin.
BY
Fred G. Dieterich
ATTORNEYS March 31, 1925.
H. G. IRWIN
HEADING MACHINE
Filed Feb. 24, 1921
1,531,293
7 Sheets-Sheet 4
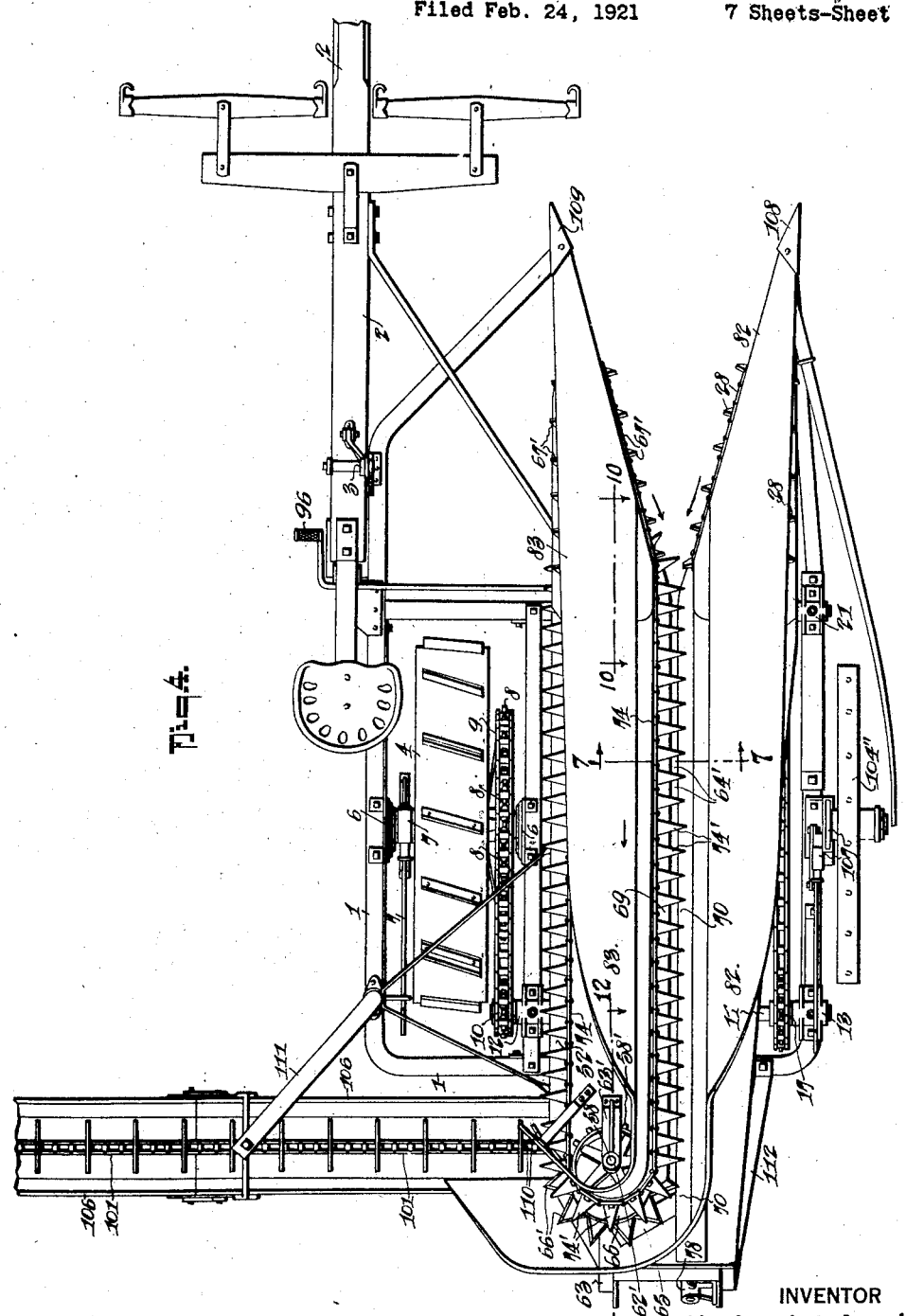
INVENTOR
Herbert G. Irwin.
BY 
ATTORNEYS

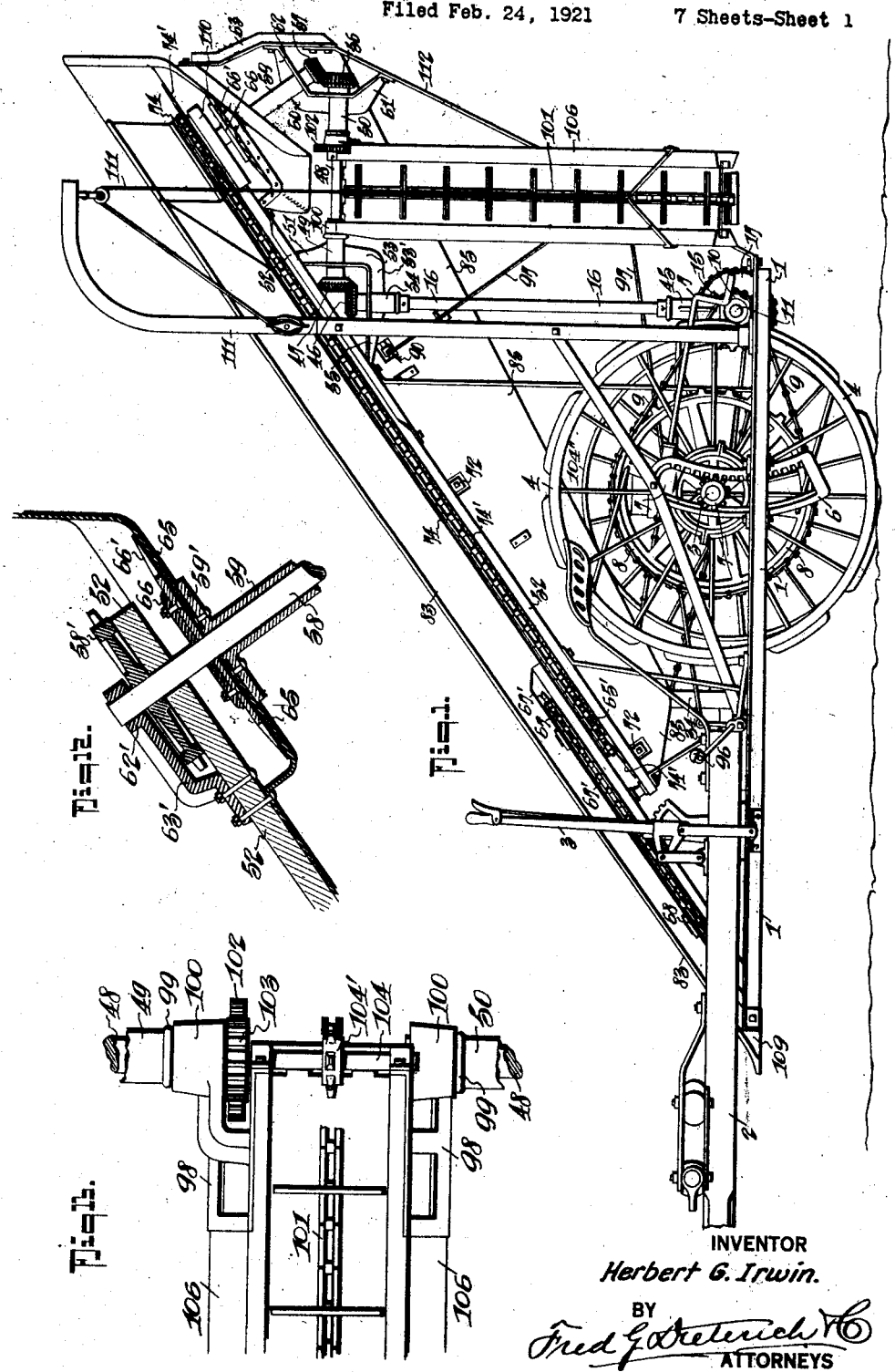

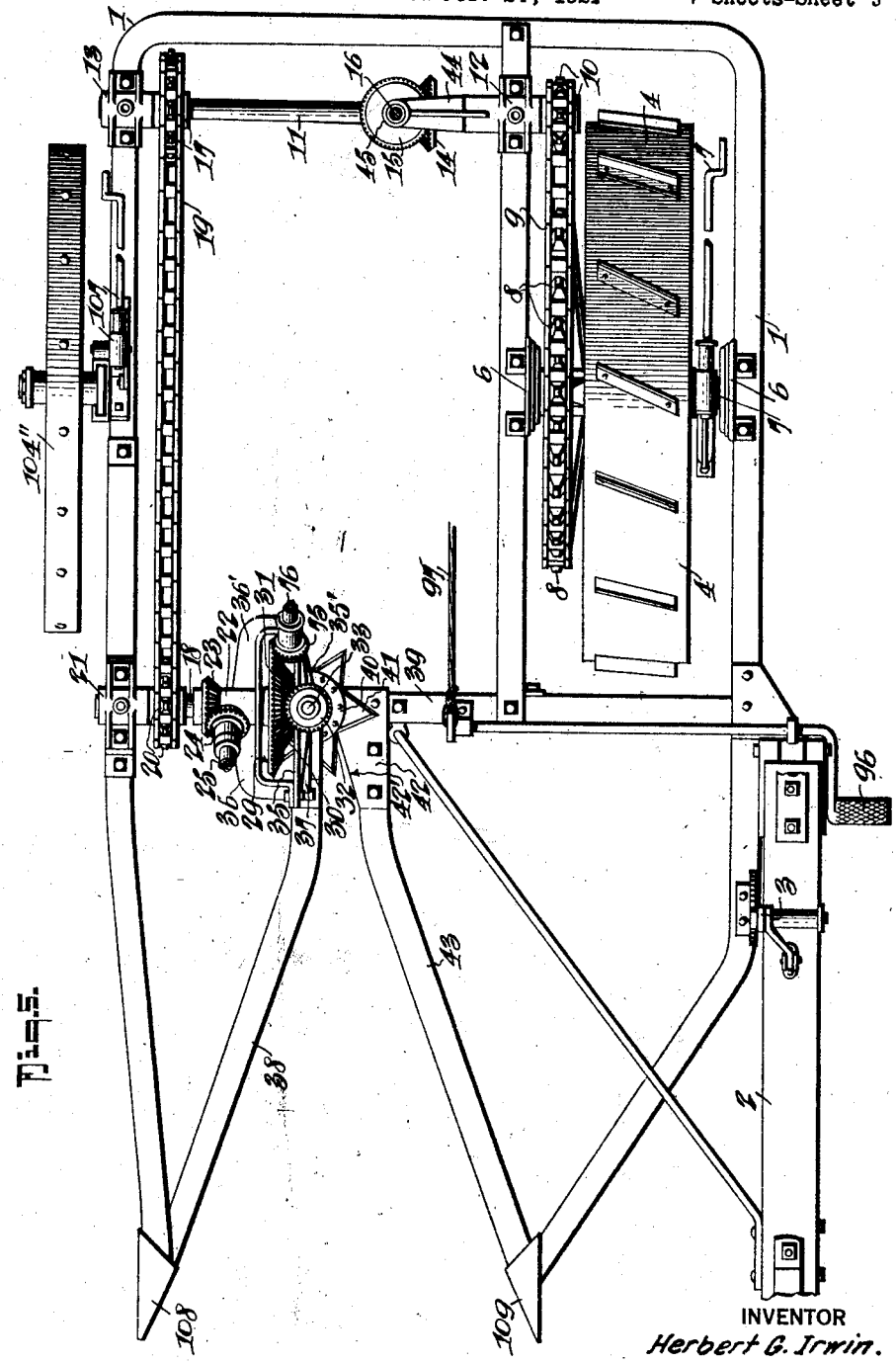

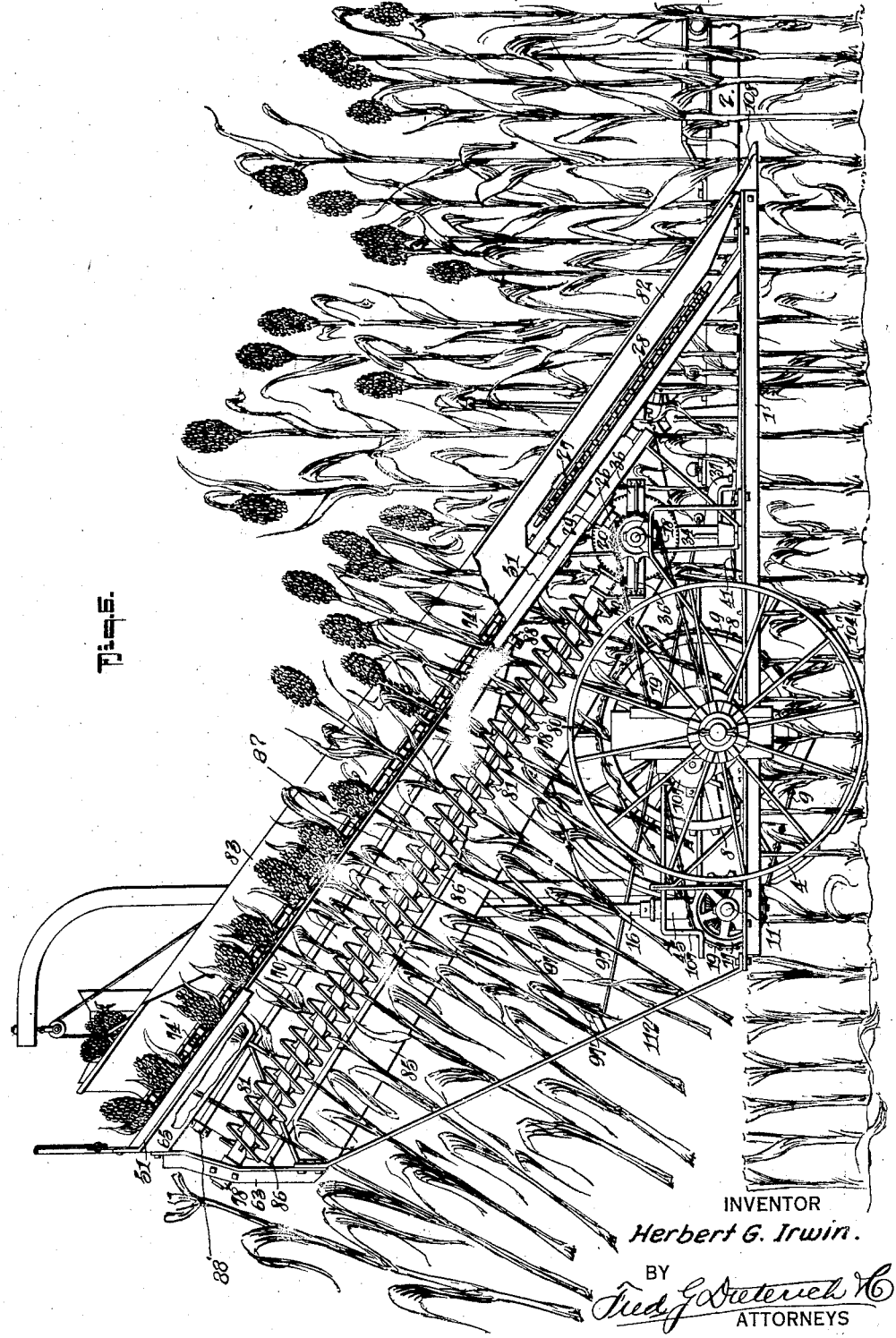

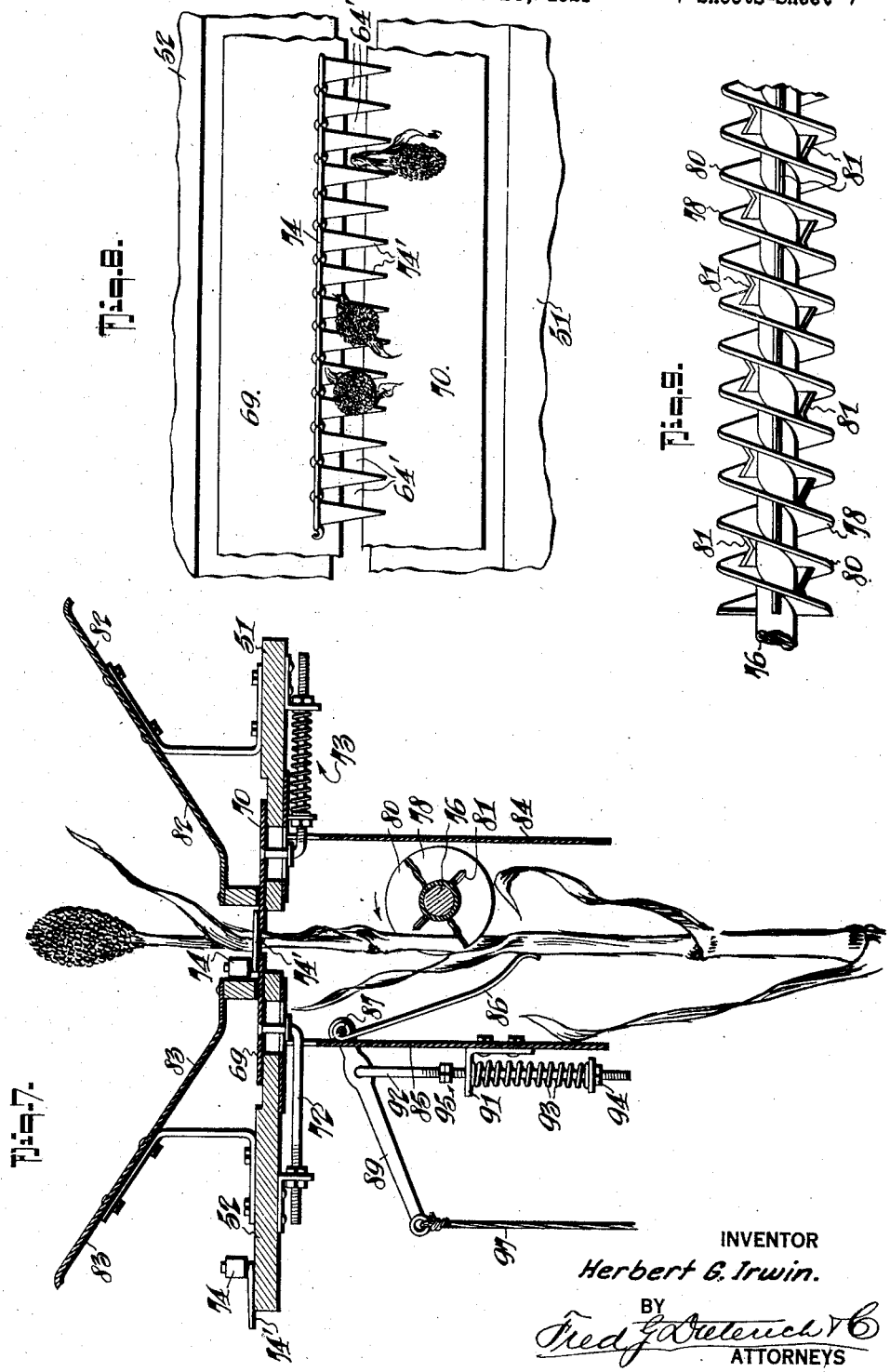

Patented Mar. 31, 1925.

1,531,293

UNITED STATES PATENT OFFICE.

HERBERT G. IRWIN, OF FLOYDADA, TEXAS.

HEADING MACHINE.

Application filed February 24, 1921. Serial No. 447,423.

*To all whom it may concern:*

Be it known that I, HERBERT G. IRWIN, a citizen of the United States, residing at Floydada, in the county of Floyd and State of Texas, have invented a new and Improved Heading Machine, of which the following is a specification.

This invention has reference to that type of harvesting machines more especially adapted for harvesting Milo maize, kafir corn, and other similar grains.

Primarily, my invention seeks to provide a relatively simple and efficient means whereby the heads of grain, particularly of the character referred to, may be cut from their stalks at a common point below the heads as the machine progresses along a row of stalks.

Secondary objects of my invention are to provide new and improved means whereby, as the machine is drawn along the row of stalks, the stalks will be successively conveyed in position for being cut at a desirable and uniform distance from the ground; to provide compensation mechanism adapted to engage the stalks as they are being conveyed to the head severing means and operating on the upper portion of the stalks for drawing them downward to cause their heads to come to uniform position relatively to the head severing devices; to provide means for automatically holding the stalks of different thickness, in engagement with the compenstating means to facilitate the drawing of the different lengths of the stalks downward to a predetermined position and for evening the heads; to provide an improved arrangement of means for conveying the severed heads to one side of the machine for being received in a wagon drawn alongside of such machine, as the headed stalks are discharged from the machine, and to improve generally the construction and arrangement of the parts of a heading machine to the end that the cost of manufacture may be minimized, the life of the machine prolonged and the operation thereof simplified.

With the several objects stated, and such other objects as will incidentally, hereinafter appear, my invention consists of a heading machine that embodies the peculiar construction, arrangement and combination of parts, fully explained in the following detailed description, specifically brought out in the appended claims and as illustrated in the accompanying drawings, in which;

Figure 1 is an elevation of the left hand side of a heading machine embodying my improvements, the severed heads conveyor being shown folded back and lowered to the traveling position.

Figure 2 is a rear elevation of my heading machine, the severed heads conveyor being shown in full lines raised to the operating position, the front extension thereof being shown folded back in dotted lines.

Figure 3 is a side elevation of the right hand side of my heading machine, parts being broken away to illustrate the lower end of the spiral conveyor, the conveyor gear transmission and the primary sickle, one of the short conveyor chains being also shown in this view.

Figure 4 is a top plan view of the machine and it illustrates the conveyor chains, the upper or secondary sickle and the heads conveyor.

Figure 5 is a plan view of the main frame, the ground wheels and the main gearing.

Figure 6 is a side elevation of the right hand side of the machine, the lower fender at that side being omitted, the upper end of the upper fender being broken away and the lower portion thereof also partly broken away to better illustrate the location of the primary conveyor, the chain conveyor and the compensating or spiral conveyor mechanism hereinafter specifically referred to.

Figure 7 is a detail cross section of the intermediate boards, the heads retainer plates, the upper and lower fenders, the spiral conveyor and the presser apron, a stalk of grain being also illustrated as engaged between the spirals of the spiral conveyor. See line 7—7 on Figure 4.

Figure 8 is a detail plan view of a portion of the main conveyor chain with the fingers disposed across the narrow passage between the head retaining plates, forming a series of four-sided openings in which individual stalks are retained during the functioning of the compensating conveyor and the secondary sickle, hereinafter fully explained.

Figure 9 is a detail side elevation of a portion of the compensating or spiral conveyor and illustrates the relation of the series of cooperating projecting members located at the bottom of the spirals.

Figure 10 is a detail longitudinal section of the sprocket gearing for driving the short left hand conveyer chain by the main conveyer chain. See line 10—10 on Figure 4.

Figure 11 is a detail side elevation of the drive gear connections 102—103 for the heads conveyer mechanism, hereinafter explained.

Figure 12 is a cross section of the main conveyer chain driving sprocket, the upper or secondary rotary sickle and sickle plate. See line 12—12 on Figure 4.

Figure 13 is a detail plan view of the inner end of the heads conveyer and hereinafter more specifically referred to.

In the drawings, in which like parts are designated by like numerals in all of the figures, 1 designates the main frame of the heading machine, 2 the tongue and the draft devices to which the heading machine is coupled in any approved manner, and 3 denotes a tilting lever that is mounted on the tongue 2 and which serves as a means for adjusting the front end of the heading machine down, when harvesting fallen or short grain.

Referring now more particularly to Figures 1 and 5 of the drawings, 4 designates the main ground wheel journaled on a shaft 5 whose opposite ends are mounted in arc-shaped brackets 6, the said brackets and the adjacent ends of the shaft having gear connections of well-known arrangement whereby to provide for raising and lowering the machine in heading different kinds of grain. 7 designates the raising devices that cooperate with the brackets 6 and the shaft 5.

8 designates a main sprocket wheel and it is mounted on the main ground wheel 4 and around which passes a main drive chain 9 which also passes over a countershaft driving sprocket wheel 10 so that the motion of the ground wheel 4 will be transmitted directly to the countershaft 11 that is mounted on the bearings 12 and 13 (see Figure 5).

A bevelled driving gear 14 is rigidly secured to the countershaft 11 and it meshes with a bevelled driving gear 15 rigidly secured to the lower end of a vertically disposed power transmission shaft 16.

17 designates a driving sprocket on the shaft 11, which, through the chain drive 19 and a sprocket 20, transmits motion to a shaft 18 in parallel with and located at the forward end of the header frame. The shaft 18 is mounted in bearings 21 and 22 and upon it is also rigidly mounted a bevelled pinion 23 which meshes with a like pinion 24 rigidly secured to a shaft 25 which is mounted in an obliquely disposed sleeve bearing 26, best shown in Figure 3.

A sprocket gear 27, that is rigidly secured to the upper end of the shaft 25, is adapted to drive a short conveyor chain 28, which is hereinafter termed the "primary conveyor."

A gear 29, provided with two distinct bevelled faces 30—31, is rigidly secured upon the inner end of the driven shaft 18, the face 30 of the said gear being adapted to mesh with a bevelled pinion 32 rigidly secured upon the upper end of a vertically disposed shaft 33 that is mounted in a relatively long bearing sleeve 34 (see Figure 6).

A rotating member 40 is secured to the lower end of the above mentioned shaft 33 and it has a plurality of sickle sections that form a rotating sickle 41, the latter being rotated for cooperating with a knife plate 42 that is secured to the frame member 43 and whose cutting edge 42' is disposed slightly below the path of rotation of the sickle 41, the said knife plate 42 comprising the primary cutting devices, best shown in Figure 5.

The lower end of the bearing sleeve 34 is provided with integral radially extended arms 37—37' that project over the sickle 41 and beyond the radius of the sickle, their outer ends being angled downward and rigidly secured to the frame members 38 and 39, to thereby constitute rigid supports for the fixed bearing sleeve 34.

The upper end of the sleeve 34 is provided with integral oppositely projecting bracket arms 35—35' (see Figure 5) and are likewise secured to similarly disposed arms 36—36', at their extremity forming a support for a tubular bearing 22 through which the shaft of the driving gear 29 passes, as clearly indicated in Figure 5.

The face 31 of the driving gear 29 is arranged to mesh with a bevelled pinion 75 which is rigidly secured to the lower end of the compensating spiral conveyor shaft 76 supported at the said lower end by a sleeve bearing bracket 79 (see Figure 3), which is securely mounted on the bracket member 36', as shown.

The upper end of the spiral conveyor shaft 76 is supported by a sleeve bearing 78 bracketed to a brace member 63 (see Figures 2 and 4) and the said shaft 76 is provided with spirals, preferably two, 78 and 80, a portion of such spirals being shown in detail in Figure 9, by reference to which and to Figure 7, it will be observed that at the bottom of the spirals are secured thin tapered projections 81 that extend lengthwise of the shaft and to the side faces of the spirals, the purpose of which will hereinafter be explained.

Referring now to Figure 2 of the drawings it will be observed the countershaft bearing 12, before referred to, is rigid with a bracket 44, it being preferably formed integral with such bracket, and the said bracket 44 has a long vertical sleeve 45 in which is supported the lower end of the vertical transmission shaft 16.

46 designates a bevelled gear that is rigidly secured upon the upper end of the shaft 16 and which meshes with a bevelled gear 47 that is fixedly attached to the inner end of a horizontally disposed shaft 48 which is carried in the sleeve bearings 49 and 50 (see Figure 1 which also shows the sleeve bearing 49 as integral with a vertically disposed arm 51 that is secured at its extremity to the under side of the left hand intermediate board 52, presently further referred to).

The bearing sleeve 49 is also formed with an integral pendent bracket 53 that includes a horizontal member 53' which carries the integral vertically disposed bearing sleeve 54 which supports the shaft 16, before mentioned.

A horizontal arm 55 integral with the sleeve 54 is projected forwardly therefrom and has its forward extremity secured to the under side of the board 52, as will be apparent from Figure 1, a gear 56 secured on the rear end of the shaft 48 being held in mesh with a bevelled gear 57 that is rigidly secured to the lower end of a shaft 58 which has bearing in an obliquely disposed sleeve 59 integral with a bracket 60 carried by the bearing sleeve 50.

The bearing sleeves 50—59 mentioned have projecting arms 61—62, the outer end of the arm 62 being fixedly attached to a brace member 63 and the arm 61 likewise secured to a brace member 112 (see Figure 1).

The sleeve 59, which is a relatively long one, has a flange 59' at the uppermost end thereof (see Figure 12) that is rigidly secured to a secondary sickle plate 65 in any substantial way. A rotating head 66 is fixed to the shaft 58 and is located slightly above the plate 63, and the said head is provided with a plurality of radial sickle members 66', the latter and a stationary member 65 constituting the secondary sickle devices before referred to. A sprocket 58' is secured to the upper end of the shaft 58 above the sickle head 66 and slightly beyond the upper end of the intermediate board 52, the said sprocket 58' serving as a drive for the main conveyor chain 4.

A sleeve bearing 62' is provided to receive and support the upper end of the shaft 58 and it is formed intergral with a bracket 63' which projects over the sprocket 58' and is substantially secured to the upper sides of the intermediate board 52, as is best shown in Figure 12.

The main conveyor chain 74, before referred to, consists of numerous links, each of which is provided with a thin finger 74' that tapers from the link to a point opposite the link, and the said chain 74 passes around the upper sprocket 58' on the secondary sickle device shaft 58 and a lower sprocket 65' that is mounted on a stub shaft or spindle 66ª, motion imparted to the sprocket 58' being transmitted to the said sprocket 65'. 67 designates another sprocket that is also mounted on the spindle 66ª (see Figure 10) and which drives a small or primary conveyor chain 67' that is trained around a small idler sprocket 68, as clearly shown in Figure 1.

The motion of the main ground wheel is transmitted, through the various gearings mentioned, to the chains 74 and 67', as will be readily understood.

A portion of the intermediate board member 52 and a like member 51, on the upper side and along the inner edges thereof, is removed to receive head retaining plates 69—70, as is best shown in Figure 7, by reference to which it will be seen the plates 69—70 are oppositely disposed and in like manner along the inner edges of the boards 52—51, in the recessed portions thereof, and plate 69 is provided with means, generally designated 72, at intervals throughout its length, for thereby rigidly adjusting the said plates 69 toward and from the plate 70 so as to diminish or increase the space between the said plates to receive large or small stalks common in different kinds of grain. The plate 70 is provided, at intervals along the length thereof, with resilient adjusting means designated 73, whose purpose is to allow the plate 70 to spring back or yield in case an extra large stalk is forced between the opposing edges of the plates 69—70 when they are closely adjusted for harvesting grain of small stalk and relatively small head, or should other grain be mixed with grain having large stalks, the plate 70 will be forced against the spring means 73 and the stalk or stalks will then pass between the said plates 69—70 without danger of breaking the finger 74' on the conveyor chain.

The inside path of the chain fingers is directly over the space between the heads retaining plates and thus the fingers extending across the said space form four-sided openings 64', for a purpose which will be presently explained.

The intermediate boards 52—51, referred to, are provided with right and left fenders top and bottom fenders 82, 83, 84, 85. The top fenders 82—83 are to prevent leaning stalks lodging in the conveyor chain sprockets and to facilitate drawing the heads of the stalks down upon the main conveyor chain fingers and head retainer plates. The bottom fenders 84—85 which are disposed vertically, one to each side of the path of travel of the stalks, prevent the said stalks entangling with the lower gearing of the machine.

As hereinbefore explained, the spiral conveyor has projections 81—81 at the bottom of the spirals, and to provide for holding the stalks in desired contact with the spiral conveyor the left hand fender 85 is provided with a presser apron 86 which extends lengthwise and along the inner side of the fender 85, as best shown in Figure 7.

The apron 86, which is of a thin substantially rigid metal sheet, is fixedly attached to a shaft 87 Fig. 7 which is mounted bearings 88—88' (see Figure 6) on the inside of the fender 85. The shaft 87 is provided with an arm 89 which is rigidly secured thereto and which projects through an opening 90 in the fender 85 with right angled relation to the apron 86. The arm 89 is provided with tension devices comprising an angled bracket 91 rigidly secured to the fender 85, a rod 92 whose upper end connects with the arm 89 and its lower end passes through the angled bracket 91 and carries a tension spring 93 and a tightening nut 94, whose upper end is provided with an adjustable stop lock 95, as clearly shown in Figure 7.

The presser apron 86 is adapted to press the stalks against the projections 81 at the bottom of the spirals of the compensating conveyor, as is clearly shown in Figures 6 and 7, the lower edge of the apron 86 being so inclined as to extend slightly under the conveyor while the nut 95 acts as a stop preventing the presser apron 86 coming into contact with the conveyor. A foot pedal 96 is provided adjacent the driver's seat, which is connected with the swingable arm 89 through suitable pulley transmission 97—97', the foot lever device being used for adding extra pressure to the presser apron at intervals, when drawing down large stalks, as previously mentioned, or stalks having excess foliage.

In its complete development, my heading machine includes means for conveying the heads from the heading mechanism into a wagon, drawn alongside of the machine, and such means comprising brackets 98 secured to one side of the heads conveyor frame near the intake end thereof, as shown in Figure 2. The brackets 98 have cuffs 100—100 journaled over the inner end of the bearing sleeves 49—50 and they are held against lateral movement by a flange 99 on each sleeve, as clearly shown in Figures 1 and 13. A spur gear 102 is made fast on the shaft 48 and it is adapted to drive the spur gear 103, which is fast on a shaft 104 supported by sleeve bearings secured to the lower portions of the bracket 98, a small sprocket 104' being secured to the shaft 104 centrally between the opposite brackets 98 and adapted to drive the conveyor chain 101 that passes over the sprocket 105 at the outer end of the conveyor.

111 designates suitable means for supporting the conveyor, as will be readily understood by referring to Figures 1, 2, 3 and 4 of the drawings. 104'' designates the ground wheel on the grain side of the machine and 107 the raising gear.

The construction and arrangement of the various parts of my embodiment of heading machine having been thus fully described it is thought the operation and the advantages of my invention will be readily understood by those familiar with the working of machines of this kind. Briefly stated, the machine is drawn over a field along a row of grain by draft animals, with a row of stalks disposed centrally between the divider points 108—109. As the machine moves the main ground wheel imparts motion to the machine, through the sprocket and beveled gearing shown and described, the conveyor chains 28, 67' and 74 are caused to rotate in the direction indicated by the arrows on Figure 4 the drawings, and the stalks will be successively taken between the fingers 74' of the main conveyor chain 74 and conveyed between the head retaining plates 69—70 simultaneously as the primary sickle 41 cuts off the same. The cut stalks are enclosed, individually, in the four sided openings 64' formed by the fingers 74' and the plates 69 and 70. Thus, they take the motion of the fingers and are brought to engagement between the spirals 78—80 of the compensating conveyor, which is rotating rapidly in the direction indicated by the arrow. As the stalks progress along the spirals they are forced against the projections 81 by the presser apron. Each of the projecting members 81 exercise a downward pull as they project a stalk, moving the said stalk until the head is located upon the conveyor chain finger and the head retaining plates, as clearly shown in Figure 6.

The downward pull is exercised on the stalks in accordance with the pressure applied to the presser and in the event that tangled or relatively large stalks do not ride down, the driver may readily apply his foot to the pedal 96 and thereby add sufficient pressure to draw the same down. The stalks traveling continuously with the conveyor chain fingers and along the spirals of the compensating conveyor are brought in contact with the sickle 66' and knife 65 disposed between the conveyor chain fingers and head retainer plate, as will be obvious upon reference to Figures 1 and 4, and consequently the heads will be cut from the stalks at that point below the same, and as the conveyor chain fingers with the heads therein move across adjacent eccentrically disposed stopping plates 110 (see Figure 4) the heads will be removed from the fingers, falling upon the conveyor chain 101, and thereby they will be conveyed into a wagon which may be drawn alongside of the machine under the outer end of the conveyor 106.

The stalks relieved of their heads are discharged by the spiral conveyors and fall on the ground at the rear of the machine.

What I claim is:

1. A wheeled frame carrying an inclined platform having a centrally disposed open ended slot, oppositely disposed and inclined revolving members mounted forward of the forward end of the slot for guiding the stalks into the slot, a pair of top fenders and a pair of bottom fenders disposed on opposite sides of the slot, a main stalk cutting mechanism mounted below the forward end of the slot for cutting the stalks at a uniform height above the ground, a second stalk cutting mechanism at the upper end of the slot, means acting on the stalks underneath the slot tending to pull the stalks through the slot, rearwardly traveling fingers projecting across and coacting with the slot to form a series of rearwardly moving openings adapted to receive individual stalks successively as they stand in the row and to catch the heads thereof simultaneously as the stalks are pulled downward and conveyed to the second stalk cutting mechanism for severing approximately all of the stalks at a uniform distance from the heads, means for stripping the said heads from the fingers after the heads have been severed from the stalks, means for discharging the heads and further means for discharging the headed stalks from the machine.

2. A wheeled frame carrying an inclined platform having an inclined open ended slot, a pair of inclined revolving conveyer chain members disposed on opposite sides of the row of stalks for guiding the stalks successively between rearwardly traveling fingers and into the slot, a rotating cutting mechanism mounted under the forward end of the slot, adapted to cut the stalks at uniform distance from the ground as the machine is drawn along a row of stalks, means disposed in a plane between the said cutting mechanism and the said slot for engaging the cut stalks and tending to draw the stalks through the slot, a series of rearwardly traveling fingers coacting with the slot to seize the heads of the stalks and convey the stalks pendent thereby into a second rotating cutting mechanism for severing the stalks at a uniform distance from the heads thereof, means disposed eccentrically on opposite sides of the forward path travelled by the fingers for stripping the severed heads from between the fingers, means for discharging the headed stalks from the machine, and further means for discharging the heads of the stalks from the machine.

3. In a machine of the character described, a wheeled frame, primary cutting mechanism at the forward end of the machine for cutting the stalks at a uniform height from the ground, a primary conveyor which directs the stalk rows toward the said primary cutting mechanism, a secondary cutting mechanism for severing the heads from the cutting stalks, the said secondary mechanism being located to the rear and above the primary cutting mechanism, a supplemental conveyor that operates in harmony with the primary conveyor for advancing the cut stalks with their heads in engagement with the said secondary cutting mechanism, and a further conveying means that engages the stalks and tends to maintain their head ends in advancing alignment as they approach the secondary cutting mechanism and power transmission mechanism which connects with the several conveyor mechanisms and with a rotative part of the machine.

4. In a machine of the character described, a wheeled frame, primary cutting mechanism for cutting the stalks at a uniform height above the ground, a primary conveyor for advancing the stalk rows toward the said primary cutting mechanism, a supplemental mechanism for severing the heads from the cut stalks, supplemental conveying means that operate in harmony with the primary conveyor for advancing the cut stalks to the heads severing mechanism, the said supplemental conveying means including members that engage the cut stalks and holds the stalks individually separated and other members that engage the individual stalks to hold their heads in advancing alignment as they travel toward the heads severing mechanism.

5. In a machine of the character described, a wheeled frame, primary cutting mechanism at the forward end of the machine adapted for cutting the stalks at a uniform height above the ground, a primary conveyor tending to direct the stalk rows toward the said cutting mechanism, a supplemental head severing mechanism located to the rear and above the primary cutting mechanism, a supplemental conveyor that operates in harmony with the primary conveyor for carrying the several stalks with their heads to the supplemental heads severing mechanism, power transmission mechanism connecting the several cutting and conveying mechanisms with a ground wheel of the machine, said supplemental conveyor comprising oppositely disposed plates whose adjacent edges constitute the sides of a passage for the stalks, an endless chain having outwardly tapered fingers adapted for traveling across the said passage and forming individual spaces in which the stalks are individually held as they are conveyed upwardly to the supplemental head severing mechanism.

6. In a machine of the character described, a wheeled frame, a primary cutting mechanism adapted to cut the stalks at uniform distance from the ground as the machine is drawn along a row of stalks, means at the stalk entrance of the frame for directing the stalks toward the primary cutting mechanism, a secondary header or severing mechanism at the upper rear end of the machine, means for conveying the cut stalks in the direction of the said heads severing mechanism, other mechanism engaging the cut stalks as they are conveyed to the severing mechanism for drawing the stalks down to bring their heads in the desired position for being cut and simultaneously advancing the stalks.

7. In a machine of the character described, a wheeled frame, a primary cutting mechanism adapted to cut the stalks at uniform distance from the ground as the machine is drawn along a row of stalks, means at the stalk entrance of the frame for directing the stalks toward the primary cutting mechanism, a secondary header or severing mechanism at the upper rear end of the machine, means for conveying the cut stalks in the direction of the said heads severing mechanism, other means engaging the cut stalks as they are conveyed to the severing mechanism for drawing the stalks down to bring their heads in the desired position for being cut, the said conveyor means comprising an inclined platform having a longitudinal passage for the stalks stems, an endless chain having fingers projected across the said passage, a head offtake conveyor projected laterally from and cooperative with the endless chain conveyor, and a member at the return end of the conveyor for clearing the cut heads from between the conveyor fingers.

8. In a grain stalk heading machine, a grain head arresting mechanism comprising a guide having an open ended slot which extends the full length thereof, an endless conveyor chain carrying uniformly spaced fingers movable successively over the said slot, the said fingers cooperating with the slot for infolding the primary cut stalks individually at a point below their heads whereby to stop the heads in uniform relation on the slotted guide, and means for yieldably drawing the cut stalks longitudinally through the slot and for holding the heads down on the slotted guide as the stalks are conveyed laterally through the length of the slot into engagement with the cutting mechanism.

9. In a harvesting machine of the character described, the combination with the main stalk severing mechanism, a head cutting mechanism, a main conveyor for conveying the cut stalks to the cutting mechanism and a compensating conveyor engaging the stalks before they reach the head cutting mechanism.

10. In a harvesting machine of the character described, the combination with the main stalks severing mechanism, a heads cutting mechanism and a main conveyor for conveying the cut stalks to the severing mechanism; a compensating conveyor engaging the stalks before they reach the heads cutting mechanism, said compensating conveyor adapted to move the stalks with the heads in uniform relation to the heads cutting mechanism and further adapted to discharge the cut stalks from the machine, and another means for receiving the cut heads.

11. In a stalk header of the character described, the combination with a primary rotative sickle for severing the stalks at uniform distance above the ground, a secondary rotative sickle at the upper and discharging end of the machine, an inclined way connecting the lower and upper rotative sickle mechanisms, the said way having a longitudinal passage through which the cut stalks are conveyed, said passage being formed by opposing side plates whose discharging ends are located above the upper sickle, an endless conveyor that engages and conveys the cut stalks from the lower to the upper sickle, the said chain conveyor having uniformly spaced fingers that travel across the stalks passage, means operable from a drive shaft on the frame for transmitting motion to the upper and lower sickles and the endless chain, the said fingers being tapered and so spaced that trapezoidal openings are formed between the fingers adapted to individually receive a single cut stalk.

12. In a stalk header of the character described, the combination with a primary rotative sickle for severing the stalks at uniform distance above the ground, a secondary rotative sickle at the upper and discharging end of the machine, an inclined way connecting the lower and upper rotative sickle mechanisms, the said way having a longitudinal passage through which the cut stalks are conveyed, said passage being formed by opposing side plates whose discharging ends are located above the upper sickle, an endless conveyor that engages and conveys the cut stalks from the lower to the upper sickle, the said chain conveyor having uniformly spaced fingers that travel across the stalks passage, means operable from a drive shaft on the frame for transmitting motion to the upper and lower sickles and the endless chain, the said fingers being tapered and spaced to form trapezoidal openings between adjacent fingers, each of the said openings being adapted for receiving a single cut stalk, and the opposing side plates between which the longitudinal passage for the stalk is formed being individually secured whereby to provide for adjustment of the width of the said passage for stalks of different thicknesses.

13. In a stalk header of the character described, the combination with a primary rotative sickle for severing the stalks at uniform distance above the ground, a secondary rotative sickle at the upper and discharging end of the machine, an inclined way connecting the lower and upper rotative sickle mechanisms, the said way having a longitudinal passage through which the cut stalks are conveyed, said passage being formed by opposing side plates whose discharging ends are located above the upper sickle, an endless conveyor that engages and conveys the cut stalks from the lower to the upper sickle, the said chain conveyor having uniformly spaced fingers that travel across the stalks passage, means operable from a drive shaft on the frame for transmitting motion to the upper and lower sickles and the endless chain, the said fingers being tapered and spaced to form trapezoidal openings between the fingers, each of the said openings being adapted for receiving a single cut stalk, the opposing side plates between which the longitudinal stalk passage is formed being individually adjustable to and from each other to provide for increasing or decreasing the width of the passage to accommodate different thicknesses of stalks and means for effecting adjustment of the said plates with respect to each other.

14. In a harvesting machine of the character described, the combination with a lower stalk severing means adapted to cut all of the stalks at a uniform height above the ground, an upper cutting mechanism for severing the heads from the cut stalks, means for conveying the primarily cut stalks to the head severing mechanism, the said means including an inclined way having a longitudinal passage extending its full length for the cut stalks as they are conveyed upwardly, said conveying means comprising an endless chain having laterally projected fingers that travel across the top of the stalks passage and a compensating means engaging the stalks as they travel toward the head severing mechanism, the said compensating means being adapted to draw the different heights of stalks downwardly whereby to bring their heads in engagement with the inclined way and in position for presenting all of the stalk heads in uniform relation to the head severing mechanism and to simultaneously advance the stalks toward the said severing mechanism.

15. In a harvesting machine of the character described, the combination with a lower stalk severing means adapted to cut all of the stalks at a uniform height above the ground, an upper cutting mechanism for severing the heads from the cut stalks, means for conveying the primarily cut stalks to the head severing mechanism, the said means including an inclined way having a longitudinal passage extending its full length for the cut stalks as they are conveyed upwardly, said conveying means comprising an endless chain having laterally projecting fingers that travel across the top of the stalks passage, a compensating means engaging the stalks as they travel toward the head severing mechanism, the said compensating means being adapted to draw the different heights of stalks downwardly whereby to bring their heads in engagement with the inclined way and in position for presenting all of the stalk heads in uniform relation to the head severing mechanism, the said compensating means comprising a spiral conveyor into the entrance end of which the cut stalks are received and means, cooperative with the spiral conveyor, for holding the stalks in frictional contact with the spiral conveyor.

16. In a harvesting machine of the character described, the combination with a lower stalk severing means adapted to cut all of the stalks at a uniform height above the ground, an upper cutting mechanism for severing the heads from the cut stalks, means for conveying the primarily cut stalks to the head severing mechanism, the said means including an inclined way having a longitudinal passage extending its full length for the cut stalks as they are conveyed upwardly, said conveying means comprising an endless chain having laterally projecting fingers that travel across the top of the stalks passage, a compensating means engaging the stalks as they travel toward the head severing mechanism, the said compensating means being adapted to draw the different heights of stalks downwardly whereby to bring their heads in engagement with the inclined way and in position for presenting all of the stalk heads in uniform relation to the head severing mechanism, the said compensating means comprising a spiral conveyor into the entrance end of which the cut stalks are received, means cooperative with the spiral conveyor, for holding the stalks in frictional contact with the spiral conveyor, the said means comprising a pivoted apron that extends alongside of the spiral conveyor and tension devices that automatically hold the apron to press against the stalks and crowd them into frictional contact with the spiral conveyor.

17. In a harvesting machine of the character described, the combination with a lower stalk severing means adapted to cut all of the stalks at a uniform height above the ground, an upper cutting mechanism for severing the heads from the cut stalks, means for conveying the primarily cut stalks to the head severing mechanism, the said means including an inclined way having a longitudinal passage extending its full length for the cut stalks as they are conveyed upwardly, said conveying means comprising an endless chain having laterally projecting fingers that travel across the top of the stalks passage, a compensating means engaging the stalks as they travel toward the head severing mechanism, the said compensating means being adapted to draw the different heights of stalks downwardly whereby to bring their heads in engagement with the inclined way and in position for presenting all of the stalk heads in uniform relation to the head severing mechanism, the said compensating means comprising a spiral conveyor into the entrance end of which the cut stalks are received, means cooperative with the spiral conveyor, for holding the stalks in frictional contact with the spiral conveyor, the said means comprising a pivoted apron that extends alongside of the spiral conveyor, tension devices that automatically hold the apron to press against the stalks and crowd them into frictional contact with the spiral conveyor, said spiral conveyor having longitudinal ribs between their spirals that engage the stalks and draw them downward to bring the heads in proper condition for being engaged by the heads severing mechanism.

18. In a harvesting machine of the character described, the combination with a lower stalk severing means adapted to cut all of the stalks at a uniform height above the ground, an upper cutting mechanism for severing the heads from the cut stalks, means for conveying the primarily cut stalks to the head severing mechanism, the said means including an inclined way having a longitudinal passage extending its full length for the cut stalks as they are conveyed upwardly, said conveying means comprising an endless chain having laterally projecting fingers that travel across the top of the stalks passage, a compensating means engaging the stalks as they travel toward the head severing mechanism, the said compensating means being adapted to draw the different heights of stalks downwardly whereby to bring their heads in engagement with the inclined way and in position for presenting all of the stalk heads in uniform relation to the head severing mechanism, the said compensating means comprising a spiral conveyor into the entrance end of which the cut stalks are received, means cooperative with the spiral conveyor for holding the stalks in frictional contact with the spiral conveyor, the said means comprising a pivoted apron that extends alongside of the spiral conveyor, tension devices that automatically hold the apron to press against the stalks and crowd them into frictional contact with the spiral conveyor, said spiral conveyor having longitudinal ribs between their spirals that engage the stalks and draw them downward to bring the heads in proper condition for being engaged by the heads severing mechanism, and a lever actuated device connected with the said stalks engaging apron for effecting increased pressure on the stalks at desired times.

19. In a harvesting machine of the character described, the combination with a lower stalk severing means adapted to cut all of the stalks at a uniform height above the ground, an upper cutting mechanism for severing the heads from the cut stalks, means for conveying the primarily cut stalks to the head severing mechanism, the said means including an inclined way having a longitudinal passage extending its full length for the cut stalks as they are conveyed upwardly, said conveying means comprising an endless chain having laterally projecting fingers that travel across the top of the stalks passage, a compensating means engaging the stalks as they travel toward the head severing mechanism, the said compensating means being adapted to draw the different heights of stalks downwardly whereby to bring their heads in engagement with the inclined way and in position for presenting all of the stalk heads in uniform relation to the head severing mechanism, the said compensating means comprising a spiral conveyor into the entrance end of which the cut stalks are received and an apron cooperative with the spiral conveyor for holding the stalks in frictional contact with the spiral conveyor, a longitudinally extended shaft upon which the apron is pivoted, an arm rigidly secured to and projected laterally from the said shaft and tension spring devices connected with the said arm for normally swinging the apron against the compensating stalks.

20. In a grain holding machine, a lower or primary cutting mechanism for cutting the stalks at a uniform distance from the ground, and an upper stalk cutting mechanism for severing the heads from the primarily cut stalks, a conveying means comprising an inclined guide that extends from the lower to the upper cutting mechanism, and which has an open ended slot that extends the full length thereof and an endless chain conveyor, a spiral conveyor that operates in harmony with the endless chain conveyor, the chain conveyor being disposed in a plane above the slot in the guideway and provided with uniformly spaced fingers for projecting across the slot in the guideway for engaging the upper or headed ends of the cut stalks, the spiral conveyor being disposed below the slot in the guideway and adapted for engaging the lower portion of the cut stalks and tending to draw the cut stalks in the direction of their length through the guide slot simultaneously as it tends to move the stalks laterally through the length of the slot in the said guideway.

21. In a harvesting machine of the character described, the combination with the main severing machine, a secondary cutting mechanism for severing the heads from the primarily cut stalks, a conveyor for carrying the primarily cut stalks to the head severing mechanism, said conveyor including an inclined way having a stalks passage extending its full length, a compensating conveyor engaging the stalks as they travel up the passage and adapted to draw the individual stalks downwardly to bring their heads in uniform position for being engaged by the heads severing mechanism, the opposite edges of the stalks passage in the inclined way being yieldable relatively to each other whereby to compensate for the different thicknesses of stalks passing therebetween.

22. In a harvesting machine of the character stated, the combination with the severing mechanism at the forward end of the machine, adapted to cut the stalks at uniform distance above the ground, a heads severing mechanism at the upper and rear end of the machine, a main conveyor for carrying the primarily cut stalks to the head severing mechanism, a compensating means engaging the stalks as they travel toward the head severing mechanism, said compensating means comprising an open ended spiral conveyor into which the primarily cut stalks are received and from which the headed stalks are ejected.

23. In a harvesting machine of the character stated, the combination with the severing mechanism at the forward end of the machine adapted to cut the stalks at uniform distance above the ground, a heads severing mechanism at the upper and rear end of the machine, a main conveyor for carrying the primarily cut stalks to the head severing mechanism, a compensating means engaging the stalks as they travel toward the head severing mechanism, said compensating means comprising an open ended spiral conveyor into which the primarily cut stalks are received and from which the headed stalks are ejected, said spiral conveyor having projections located between the spirals adapted for pulling the stalks downwardly and means for holding the stalks in frictional engagement with the said spirals and projections.

24. In a harvesting machine of the character stated, the combination with the severing mechanism at the forward end of the machine adapted to cut the stalks at uniform distance above the ground, a heads severing mechanism at the upper and rear end of the machine, a main conveyor for carrying the primarily cut stalks as they travel toward the head severing mechanism, a compensating means engaging the stalks as they travel toward the head severing mechanism, said compensating means comprising an open ended spiral conveyor into which the primarily cut stalks are received and from which the headed stalks are ejected, said spiral conveyor having projections located between the spirals adapted for pulling the stalks downwardly, and means for holding stalks in engagement with the said spirals and projections, the said means including a presser apron at one side of the spiral conveyor that extends the length of such conveyor and tension devices tending to normally swing the said apron toward the said spiral conveyor.

25. In a grain stalk heading machine, the combination with a suitable wheeled drag frame; of a primary cutting mechanism adapted to sever the stalks at a uniform distance from the ground, a secondary cutting means for severing the heads from the primarily cut stalks, means for conveying the primarily cut stalks to the heads cutting mechanism, a further means engaging the cut stalks as they are being conveyed to the head severing mechanism for positioning the stalks with their heads in uniform relation as they are successively advanced to the head severing mechanism for heading.

HERBERT G. IRWIN.